(No Model.)
J. A. DYER & H. D. HOLMES.
BAND SAW GUIDE.
No. 598,476. Patented Feb. 1, 1898.
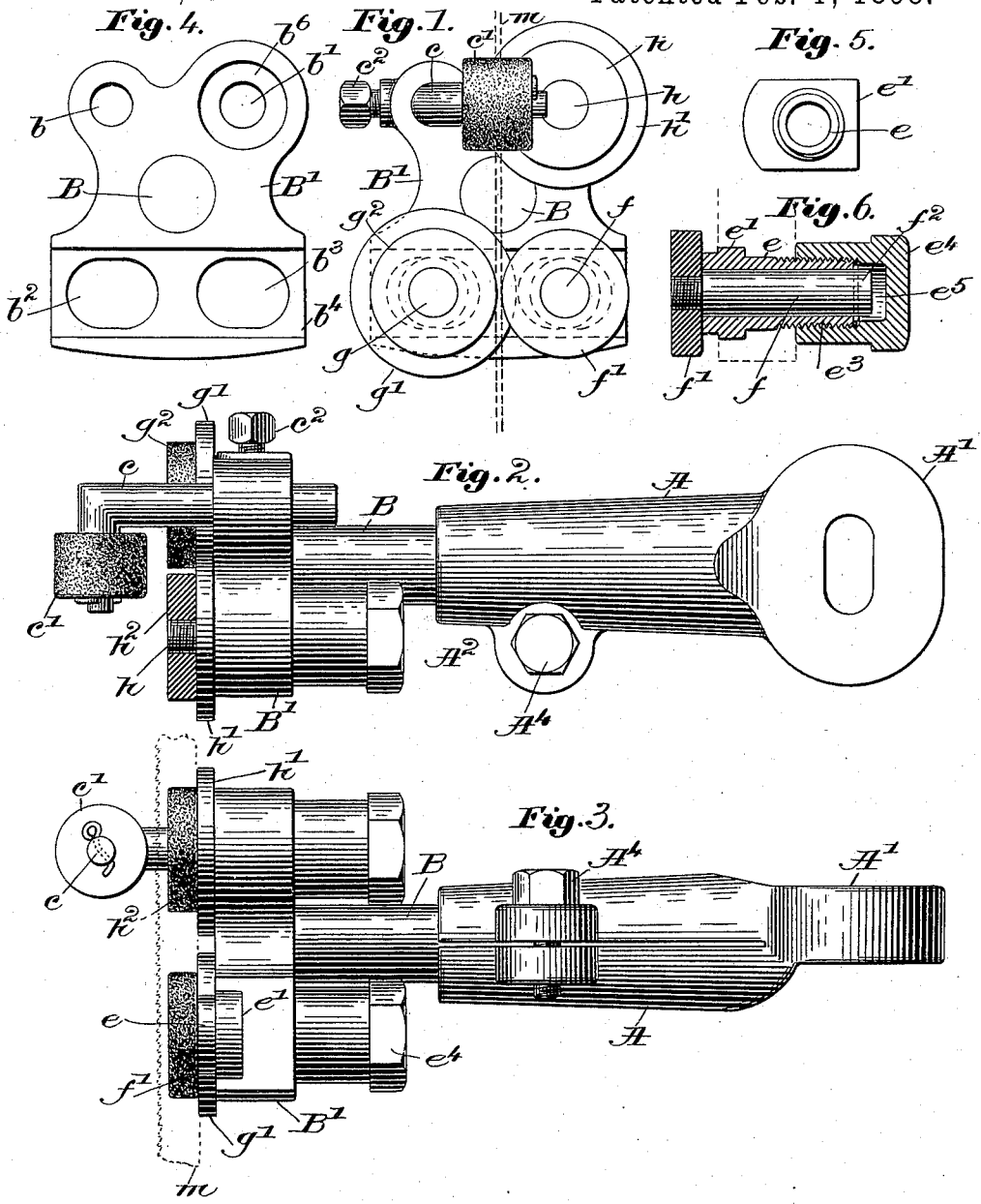
Witnesses:
Walter E. Lombard
Thomas F. Drummond
Inventors:
John A. Dyer,
Henry D. Holmes,
by Crosby Gregory
Attys.

UNITED STATES PATENT OFFICE.

JOHN A. DYER AND HENRY D. HOLMES, OF STODDARD, NEW HAMPSHIRE, ASSIGNORS OF ONE-FOURTH TO D. F. HUNT, OF ANTRIM, NEW HAMPSHIRE.

BAND-SAW GUIDE.

SPECIFICATION forming part of Letters Patent No. 598,476, dated February 1, 1898.

Application filed February 13, 1897. Serial No. 623,255. (No model.)

*To all whom it may concern:*

Be it known that we, JOHN A. DYER and HENRY D. HOLMES, of South Stoddard, in the county of Cheshire and State of New Hampshire, have invented an Improvement in Band-Saw Guides, of which the following description, in connection with the accompanying drawings, is a specification, like letters on the drawings representing like parts.

This invention has for its object the production of a novel band-saw guide by which the saw may be perfectly and accurately guided.

Our improved guide presents a pair of rotatable guide-rolls between which the saw travels, and coöperating with said rolls is a third roll, which prevents the outward bowing of the saw due to centrifugal action. Some of these rolls are provided with projecting flanges against which the back of the saw runs in use.

We have provided the guide with a guard-roll against which the teeth of the saw may strike when the material is being backed or pulled off from the saw.

Figure 1 in front elevation shows one of our improved saw-guides detached from the machine in which it is to be used; Fig. 2, a top or plan view with one of the flanged guide-rolls in section; Fig. 3, a side elevation of the parts shown in Fig. 2. Fig. 4 shows the head. Fig. 5 shows one of the sliding bearings, and Fig. 6 shows the manner of holding the roller-shafts so that they may be lubricated.

The arm A, having its end A' adapted to be connected in suitable manner to the framework of a band-saw machine, has its opposite end $A^2$ made hollow and split to receive the stud or shank B, attached to the head or roll-carrier B' of the guide, said split end having suitable ears which are entered by a screw $A^4$, which clamps the shank firmly and holds it in adjusted position. This head (shown in face view in Fig. 4) has four holes $b\ b'\ b^2\ b^3$, the holes $b^2$ and $b^3$ being elongated and opening out from a cross-groove $b^4$, made in the head, and the hole $b'$ having outside of it a chamber to present a shoulder $b^6$. The hole $b$ receives in it a bent rod $c$, provided at its outer end with a guard-roll $c'$, composed of some suitable material which should the teeth of the saw contact with it would not dull said teeth. The rod may be adjusted longitudinally in the head to adapt it to saws of different width, and when in place may be confined there by a suitable set-screw $c^2$. This roll may be of lead, rawhide, vulcanite fiber, &c., and in practice it will be so located with relation to the teeth of the band-saw $m$ (partially shown by dotted lines) that said saw may be run without touching the teeth of the saw; but when the operator desires to back off or pull off the work from the saw the removal of the saw from the rolls carrying it is prevented, and if its teeth in such operation meet the said guide-roll the teeth will not be harmed by such contact.

The holes $b'$, $b^2$, and $b^3$ each receive a similar metallic box $e$, provided with a shoulder $e'$ to contact with the head and screw-threaded externally to receive a nut $e^4$, said nuts being chambered deeply to hold a lubricant in the space $e^5$ left after screwing said nut on the said box with its end against said head. All these boxes and nuts are alike, so we need to fully show and describe only one of them— viz., the box receiving the shaft $f$, carrying the roll $f'$, said shaft at its end passed through said box receiving a pin or key $f'$ to prevent withdrawing the shaft from the box.

The roll $f'$ is screwed onto a threaded part of the shaft $f$.

The two shafts $g$ and $h$ differ from the shaft $f$ only in that they have each a flange, as $g'\ h'$, fast each on one end of the shaft back of its screw-threaded end, and the rolls $g^2\ h^2$ are screwed onto the threaded ends of these shafts, as described of the roll $f'$ on the shaft $f$, and said rolls $f'$, $g^2$, and $h^2$ may in practice all be composed of a non-metallic substance, as rawhide, so-called "vulcanized fiber," and the like.

The flanges $g'\ h'$ act to receive and support the back or untoothed edge of the saw, and said flanges moving in the direction of the travel of the saw greatly reduce the friction and strain on the saw.

The band-saw $m$ may be supposed to be carried by rollers or drums in usual manner, located at the left-hand side of the saw, (viewing Fig. 1,) and consequently when the saw is run at high speed the saw would have a tendency by momentum and centrifugal action to throw or bow out sidewise toward the right in said figure; but to obviate any action of this kind we employ the roller $h^2$, and said roll supports one side of the band-saw and its back on its way to the regular guide-rolls $f'$ $g^2$. These rolls so hold the band-saw that all tendency of the saw to twist is obviated, and the saw cuts a straighter and smoother slit than can be cut without their use.

The threaded parts of the shafts $f$ and $g$ are threaded differently, one having a right and the other a left hand thread, so that the tendency of the rolls in rotating will be to turn them onto the said shafts and not off.

By adjusting the boxes holding the shafts $f$ and $g$ in the slots $b^2$ $b^3$ we may adapt the rolls carried by said shafts to the thickness of the saw being used. The rapid rotation of the shafts in their boxes will cause the lubricant in the spaces $e^5$ to become warm, so that it can readily flow into the boxes about the shafts.

Having fully described our invention, what we claim, and desire to secure by Letters Patent, is—

1. In a band-saw guide, a head, two shafts therein each provided with a roll as $f'$, $g^2$, to act on the sides of the band-saw, one of said shafts having a flange as $g'$ for the back of the saw, combined with a third roll $h^2$ to bear against the side of the saw and direct the latter on its way between the rolls $f'$ and $g^2$, substantially as described.

2. In a band-saw guide, a head, two shafts therein, each provided with a roll as $f'$, $g^2$, to act on the sides of the band-saw, one of said shafts having a flange as $g'$ for the back of the saw, combined with a third roll $h^2$ having a flange $h'$ to also act against the back of the saw on its way between rolls $f'$ and $g^2$, substantially as described.

3. In a band-saw guide, a head, two shafts therein each provided with a roll as $f'$, $g^2$, to act on the sides of the band-saw, one of said shafts having a flange as $g'$ for the back of the saw, combined with a third roll $h^2$ and a guide-roll $c'$ against which the toothed edge of the saw may act as described.

4. In a band-saw guide, a head, a shaft, having a flange and a threaded end, a non-metallic roll screwed onto said threaded end against said flange, combined with a box, and a tubular closed nut applied to said box and adapted to contain a lubricant, substantially as described.

5. In a band-saw guide, a head, a shaft carrying a roll, a box having a shoulder adjacent said roll to bear against the front side of said head and threaded at its opposite end to extend through said head, and a tubular closed nut screwed on said threaded end and bearing against the back side of said head, the box and its contained parts being clamped in place on said head by said shoulder and nut, substantially as described.

In testimony whereof we have signed our names to this specification in the presence of two subscribing witnesses.

JOHN A. DYER.
HENRY D. HOLMES.

Witnesses:
FRED D. BROWN,
ALONZO P. KING.